(12) United States Patent
Koh

(10) Patent No.: US 6,461,189 B1
(45) Date of Patent: Oct. 8, 2002

(54) CONNECTOR MAP

(75) Inventor: Terry Koh, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/746,108

(22) Filed: Dec. 21, 2000

(51) Int. Cl.[7] .................................................. H01R 3/00
(52) U.S. Cl. ...................................... 439/491; 361/686
(58) Field of Search ................................. 439/491, 488, 439/489, 620, 676; 361/686; 40/630, 638, 663, 316; 429/1

(56) References Cited

U.S. PATENT DOCUMENTS

| | | | | |
|---|---|---|---|---|
| 2,431,999 A | * | 12/1947 | Engelhardt | .................. 439/718 |
| 4,582,251 A | * | 4/1986 | Odom, Jr. et al. | ............ 236/94 |
| 4,913,981 A | * | 4/1990 | Hynes et al. | .................. 429/1 |
| 5,303,567 A | * | 4/1994 | Nava | ........................... 70/38 B |
| 5,681,183 A | * | 10/1997 | Dzmura | ...................... 439/502 |
| 5,822,182 A | * | 10/1998 | Scholder et al. | ............ 361/683 |

* cited by examiner

*Primary Examiner*—Gary R. Paumen
*Assistant Examiner*—James R. Harvey
(74) *Attorney, Agent, or Firm*—Fletcher, Yoder & Van Someren

(57) ABSTRACT

A system and method to facilitate the connection or removal of a first connector from a second connector located on a side of a device having an obstructed view. The system includes a device having a map illustrating the portion of the device that is obstructed from view. The map is located on a more visually accessible portion of the device. The method includes using the map to identify the location of a first connector on a device. The device is then coupled to a system or second device by connecting or removing a second connector, such as an electrical cable or water hose, from the first connector.

34 Claims, 5 Drawing Sheets

CONNECTOR MAP

BACKGROUND OF THE INVENTION

1. Field of the Invention

The present invention relates generally to electrical and mechanical systems and, more particularly, to methods and apparatus for facilitating the installation or removal of coupling devices from connectors disposed on a visually obstructed portion of an electrical, mechanical, or electro-mechanical device.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many devices are coupled to other devices or systems to perform a desired function. For example, a typical computer system may consist of several devices coupled together by electrical cables. For example, a central unit housing a microprocessor may be coupled to devices such as a keyboard, a mouse, a monitor, a printer, and/or a scanner. Another example of such a system is a stereo system. A typical stereo system may consist of a number of different stereo components electrically coupled to a receiver. These components may include speakers, a CD player, a DVD player, a VCR, a tape recorder, and/or a turntable. Even mechanical systems may be coupled to other devices or systems to perform their desired functions. For example, a water faucet is coupled to a washing machine by water hoses to enable the washing machine to wash clothes.

For aesthetic purposes, these devices are typically configured with connectors on the rear of the device so that the connections and couplers are placed out of sight. These devices are typically positioned so that the rear of the device is against a wall or other visual obstruction and these devices may be difficult to move. Consequently, repositioning the system to provide greater access to the back of the device to couple or decouple other devices may be difficult or time consuming. Additionally, some systems may be fixed in a mounting assembly requiring even greater time and effort to move. Dust also tends to collect on the back of many devices. Therefore, a person placing their face in close proximity to the rear of a device to see the connectors or couplers may come into close contact with, inhale, or ingest dust particles.

Therefore, a need exists for a method or apparatus that enables connections to be made or broken on the rear of a device without requiring the device to be repositioned. Additionally, a need exists for a method or apparatus that enables an operator to identify the configuration of connectors or coupling devices on the rear of a device without requiring a person to place their face in close proximity to the rear of the device.

The present invention may address one or more of the problems discussed above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

According to one possible embodiment, an electrical device is disclosed. The device features a connector disposed on a rear portion of the device. The device also features a map illustrating the location of the connector on the rear portion of the device. The map is disposed on a top or side portion of the device.

According to another possible embodiment, a visual aid to assist in locating a connector disposed on a first portion of a device is disclosed. The visual aid features a map disposed on a second portion of the device. The map provides a representation of the connector. The representation of the connector is inverted about an axis relative to the first portion of the device.

According to another possible embodiment, an electrical device is disclosed. The electrical device features a plurality of electrical connectors disposed on a rear portion of the electrical device. The device also features a visual representation of the positions of the plurality of electrical connectors on the rear portion of the electrical device. The visual representation is disposed on a generally visible portion of the electrical device.

According to another possible embodiment, a method of assembling an electrical system is disclosed. The method features using a map illustrating a connector's position on the rear portion of an electrical device the map to identify the connector's position. The method also features locating the connector on the rear portion of the electrical device by reaching from a top or side position relative to the electrical device to the connector's position identified by the map. Additionally, the method features the act of removing a cable from the connector or connecting a cable to the connector.

BRIEF DESCRIPTION OF THE DRAWINGS

Various advantages of the invention may become apparent upon reading the following detailed description of specific embodiments and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
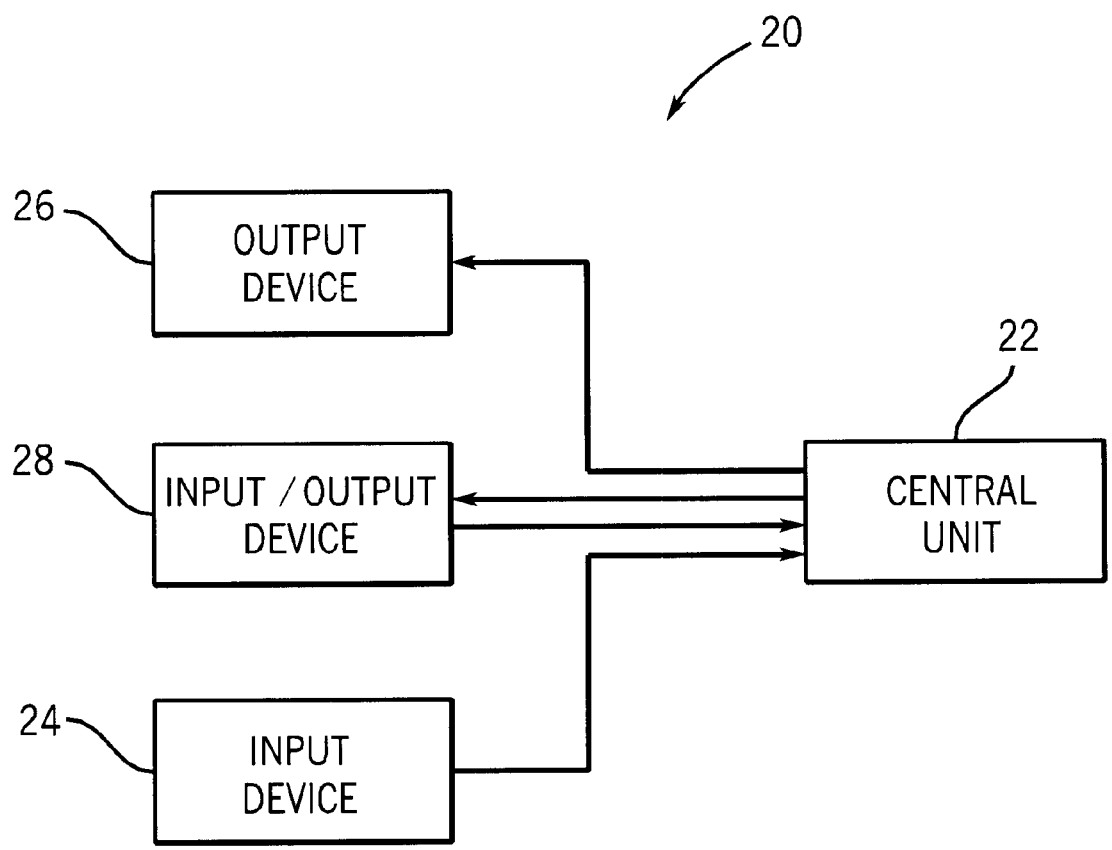
FIG. 1 illustrates a system according to an exemplary embodiment of the present invention.

Turning now to the drawings, and referring initially to FIG. 1, a block diagram depicting system 20 is illustrated. The system 20 may be an electrical or a mechanical system, but for the exemplary purpose of this discussion it may be assumed that the system 20 is an electrical system. The system 20 may be any of a variety of different electrical systems, such as a stereo system or a computer system. The system 20 includes a plurality of components electrically coupled together. For example, the system 20 may include a central unit 22 and various input and output devices coupled to the central unit 22. The system 20 may include an input device 24 to provide an input to central unit 22. Examples of an input device 24 may include: a CD player, a turntable, a mouse, a keyboard, etc. The system 20 may also include an output device 26 to receive an output from central unit 22. Examples of output device 26 may include: a pair of audio speakers, a monitor, etc. The system may also include an input/output device 28 to provide an input to central unit 22 and to receive an output from central unit 22. Examples of an input/output device 28 may include: a tape recorder, an external data storage device, etc.

A respective coupling device having a connector or one or both ends is typically used to couple each of these various devices to another device to form the system 20. The coupling device may be used to couple devices electrically, optically, mechanically, or in any other suitable manner. For example, the coupling device may be an electrical cable having an electrical connector configured for engagement with the electrical connector on the device. Alternatively, the coupling device may be a hose having a fitting configured for engagement with a fluid fitting on the device.

Figure 2:
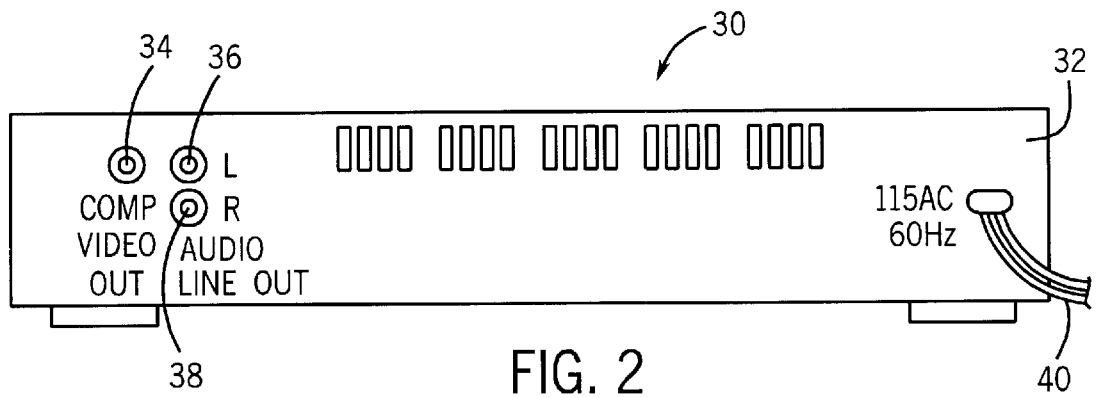
FIG. 2 illustrates electrical connectors located on a visually obstructed region of an electronic device according to an exemplary embodiment of the present invention.

Referring generally to FIG. 2, an electrical device 30 is again illustrated for exemplary purposes. The electrical device 30 has a back panel 32 that is generally oriented so that it is not normally visible. For example, electrical device 30 is designed so that back panel 32 is usually positioned near a wall or other visual obstruction. In the illustrated embodiment, various connectors, such as a video output jack 34 and two audio outputs 36 and 38, are located on back panel 32. A power cord 40 is used to supply electrical power to electrical device 30. In the illustrated embodiment, the power cord 40 is wired directly to the electrical device 30. However, the device 30 may be configured such that the power cord 40 is plugged into a power receptacle on the back panel 32.

Figure 3:
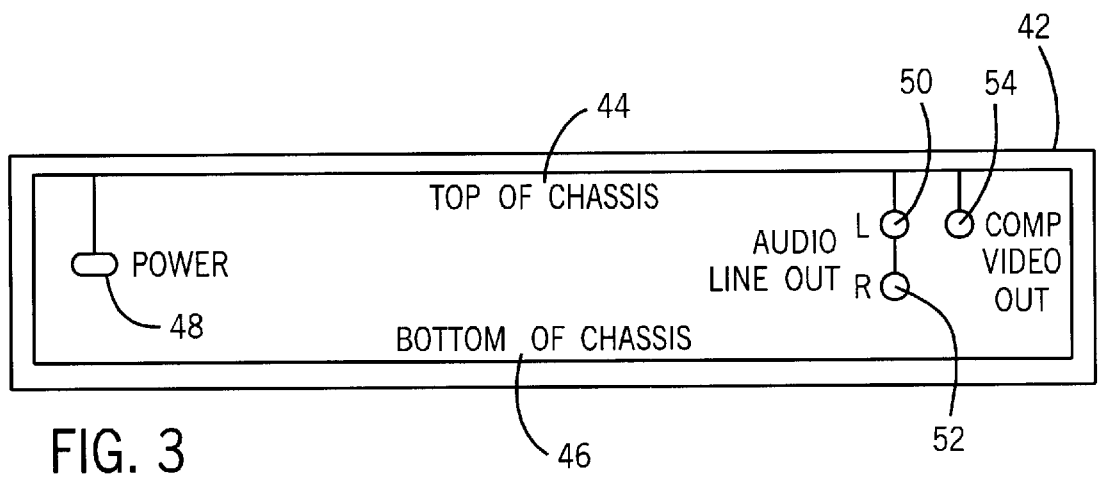
FIG. 3 illustrates a connector map corresponding to the configuration of electrical connectors located on the visually obstructed region of the electrical device of FIG. 2, according to an exemplary embodiment of the present invention.

Referring generally to FIG. 3, a connector map 42 illustrating the configuration of connectors on the back panel 32 is featured. In the illustrated embodiment, the connector map 42 illustrates the positions of several connectors on the back panel 32. Additionally, the connector map 42 has a chassis top identifier 44 and a chassis bottom identifier 46 to provide the proper vertical reference to the back panel 32. In the illustrated embodiment, the connector map 42 has a power cord identifier 48, a left audio output jack identifier 50, a right audio output jack identifier 52, and a video output jack identifier 54. The view of the back panel 32 is inverted about a vertical axis so that the identifiers are oriented to properly indicate the relative horizontal positions of the connectors on back panel 32 when the connector map 42 is placed on a top surface of the electrical device 30. The connector map 42 may comprise an adhesive plastic that can be easily and cleanly removed from electrical device 30. However, the connector map 42 also may be permanently affixed to the device 30. Also, in the illustrated embodiment, the identifiers for each of the connectors are provided in full-scale to the actual connectors. However, the identifiers may be made smaller or larger as desired. Additionally, the connector map 42 may be configured with a transparent finish.

Figure 4:
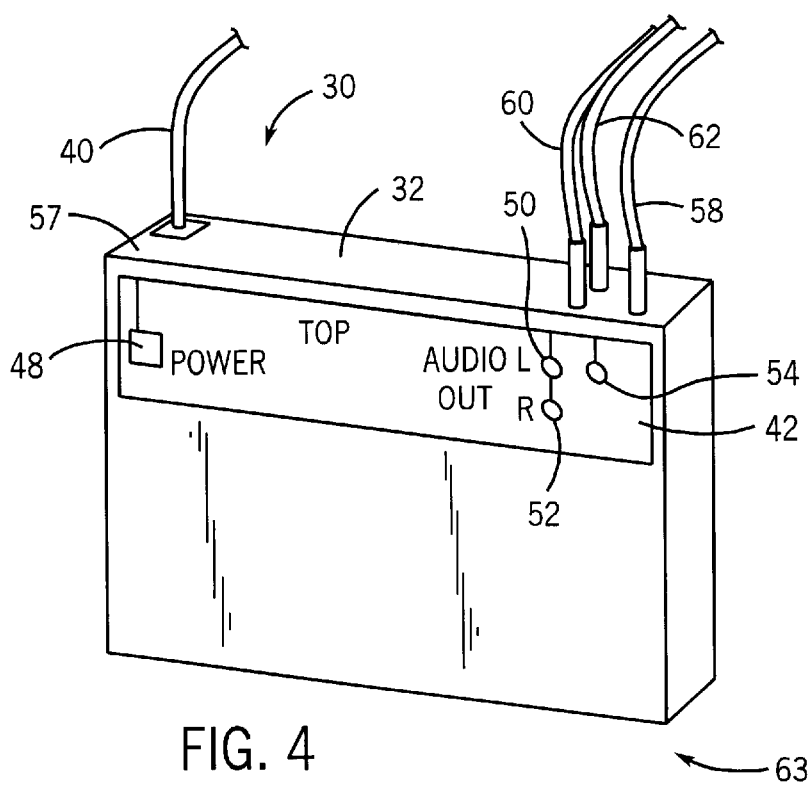
FIG. 4 illustrates a connector map located on the top surface of the electrical device of FIG. 2, according to an exemplary embodiment of the present invention.

Referring generally to FIG. 4, an electrical device 30 having a connector map 42 located on a top surface 56 of the electronic device 30 is illustrated. Connector map 42 is configured to reflect substantially the mirror image of the back panel 32 of electrical device 30. The connector map 42 is positioned proximate to an edge 57 of electrical device 30. Thus, the back panel 32 and the mirror image of back panel 32 illustrated on connector map 42 appear to be reflected about the edge 57, as if edge 57 were a mirror.

Electrical cables are connected to the various jacks on the back panel 32. A video cord 58 is connected to the video output jack 34. Additionally, a first audio cord 60 is connected to the left audio output jack 36 and a second audio cord 62 is connected to the right audio output jack 38. In this view, the identifiers on the connector map 42 can be seen to align with the connectors located on the back panel 32 when the device 30 is viewed from the front 63 of the device 30.

A person desiring to remove or connect a cable can use the connector map 42 to identify the location of the cable or connector without having to reposition the electrical device 30. A person may then reach for the cable or connector at the identified location either to install a cable to a connector or to remove a cable from a connector. The connector map 42 may be used with the central unit 22, the input device 24, the output device 26, the input/output device 28, or virtually any other device having a connector.

Figure 5:
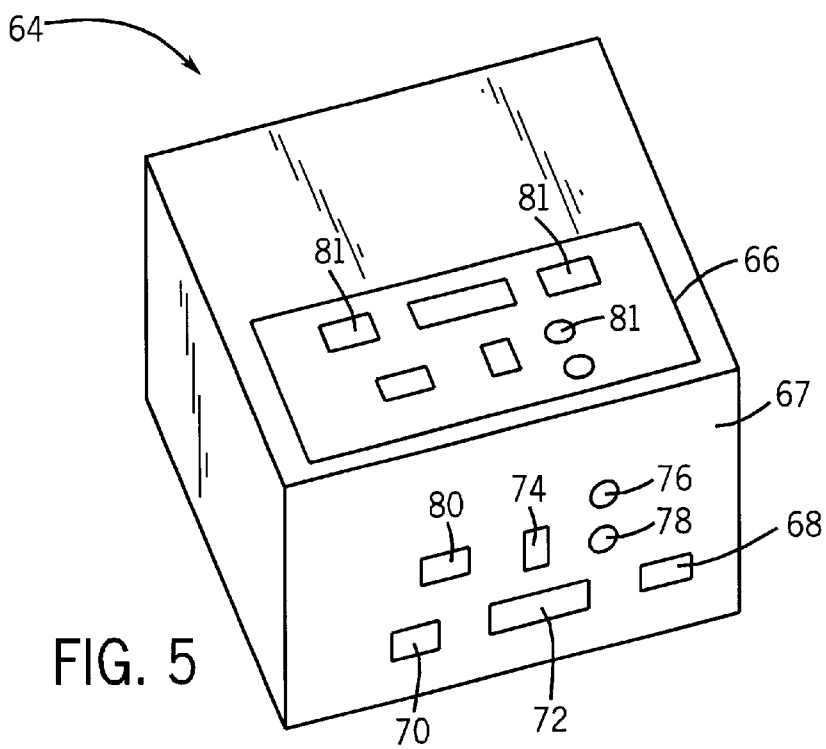
FIG. 5 illustrates a desktop computer system utilizing a connector map, according to an exemplary embodiment of the present invention.

Referring generally to FIG. 5, a desktop computer 64 is illustrated. The desktop computer 64 has a connector map 66 illustrating the location of various electrical connectors located on a rear portion 67 of the desktop computer 64. One such electrical connector is a power receptacle 68. Additional connectors may include: a serial port 70, a parallel port 72, a networking port 74, a keyboard port 76, a mouse port 78, and a monitor port 80. Additional connectors also may be provided. The connector map 66 has graphical identifiers 81 representing each of the various electrical connectors on the rear portion 67 of the computer 64. A person desiring to remove or connect a cable can use the connector map 66 to identify the location of the cable or connector without having to reposition the desktop computer 64.

Figure 6:
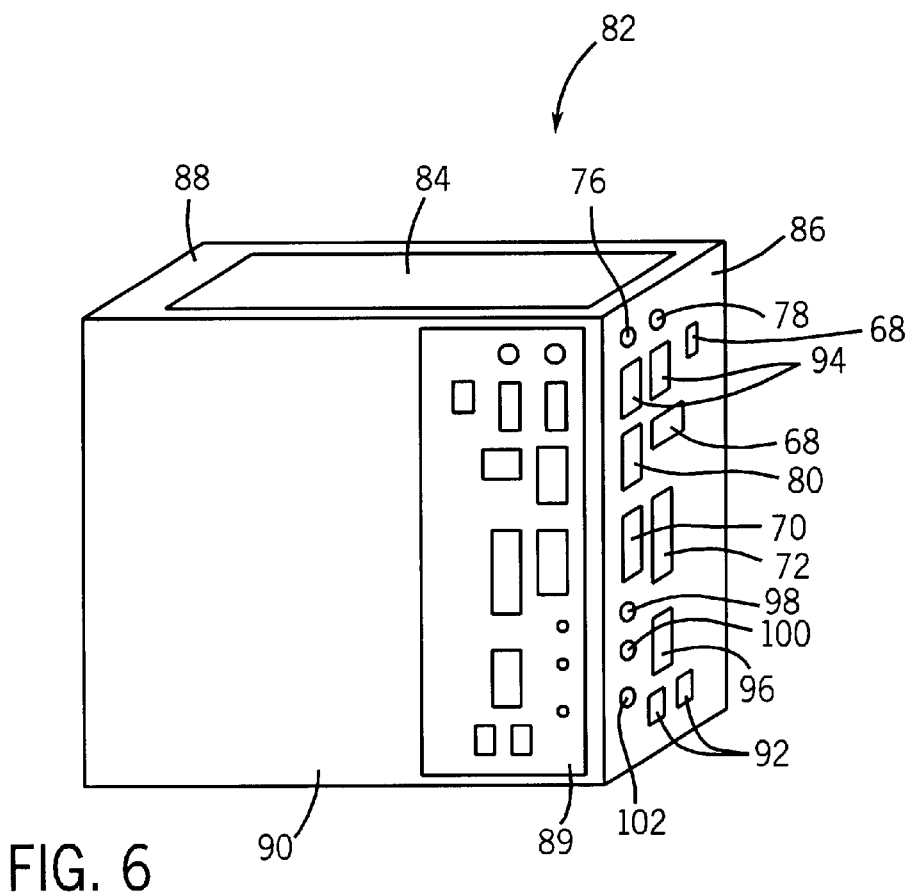
FIG. 6 illustrates a tower computer system utilizing a connector map, according to an exemplary embodiment of the present invention

Referring generally to FIG. 6, a tower computer system 82 is illustrated. The tower computer system 82 has a connector map 84 to illustrate electrical connections on a back portion 86 of the tower computer system 82. The connector map 84 is located on the top 88 of the tower computer system 82. Alternatively, a connector map 89 may be located on the right side 90 or left side (not shown) of the tower computer system 82. Electrical connectors may include: telephone connectors 92, two USB ports 94, a game port 96, an audio input jack 98, an audio output jack 100, and a microphone jack 102. The image of the back portion 86 is inverted about a vertical axis if the connector map 84 is located on top surface 88 of the device and inverted about a horizontal axis if the connector map 84 is to be located on one of the sides of the tower computer system 82.

Figure 7:
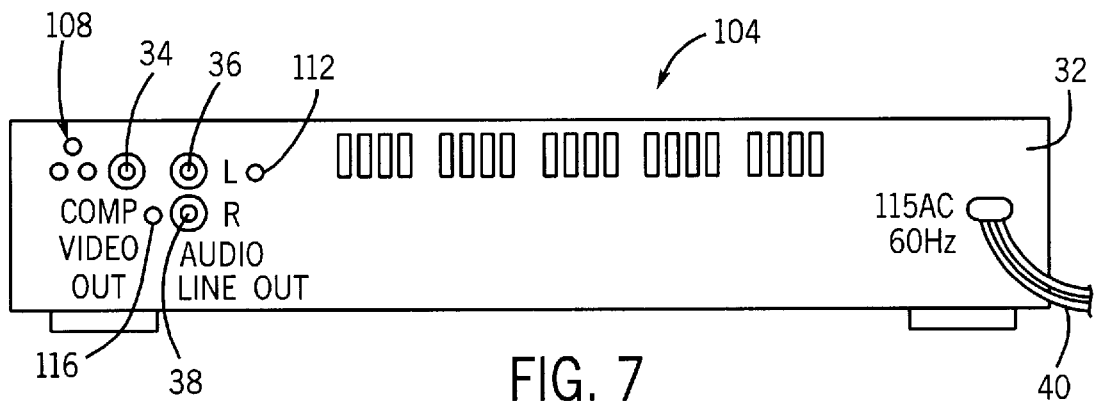
FIG. 7 illustrates an electrical device having tactile indicators located on the visually obstructed region of the electronic device corresponding to visible indicators on a connector map, according to an exemplary embodiment of the present invention.
Figure 8:
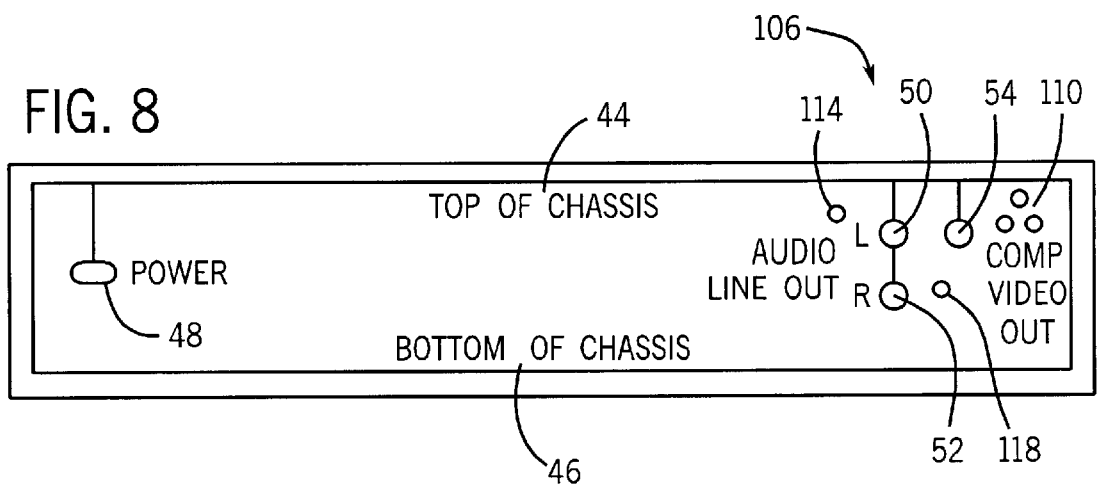
FIG. 8 illustrates a connector map corresponding to the configuration of electrical connectors and tactile indicators located on the visually obstructed region of the electrical device of FIG. 7.
Figure 9:
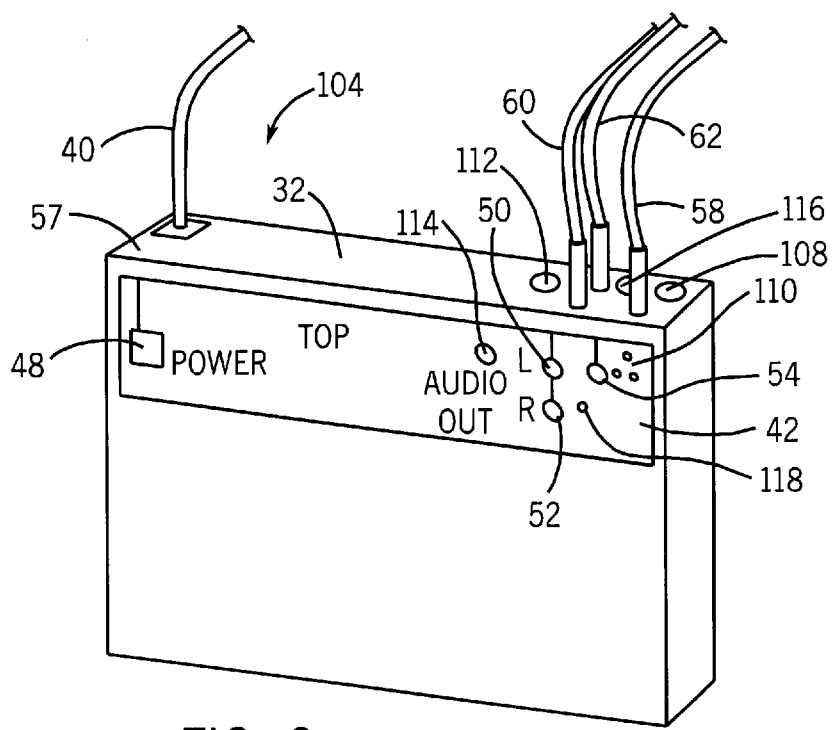
FIG. 9 illustrates a connector map located on a top surface of the electrical device of FIG. 7, according to an exemplary embodiment of the present invention.

Referring generally to FIGS. 7, 8 and 9, an alternate embodiment of an electrical device 104 and a connector map 106 is featured. The electrical device 104 includes tactile indicators to assist an operator in installing or removing cables from the electrical connectors on the back 32 of the device 104. In the illustrated embodiment, a first tactile indicator 108 is disposed adjacent to the video output jack 54. Additionally, a representation 110 of the tactile indicator 108 is illustrated on the connector map 106 at its proper relative position. A second tactile indicator 112 is disposed adjacent to the left audio output jack 50, and representation 114 of the tactile indicator 112 is illustrated on the connector map 106. A third tactile indicator 116 is disposed adjacent to the right audio output jack 52, and representation 118 of the tactile indicator 116 is illustrated on the connector map 106. The tactile indicators 108, 112 and 116 are used to identify an electrical connector by touch. For example, a tactile indicator 108, 112 or 116 may be a configuration of raised bumps, such as Braille, raised or recessed geometric shapes, a fuzzy material, such as Velcro, or any other suitable shape or material identifiable by touch. A person desiring to remove or install a cable can feel for the corresponding tactile indicator on the back of electronic device 104 to identify the correct electrical connector before removing or installing the electrical cable. Thus, connectors spaced closely together may be distinguished from adjacent connectors more easily.

Figure 10:
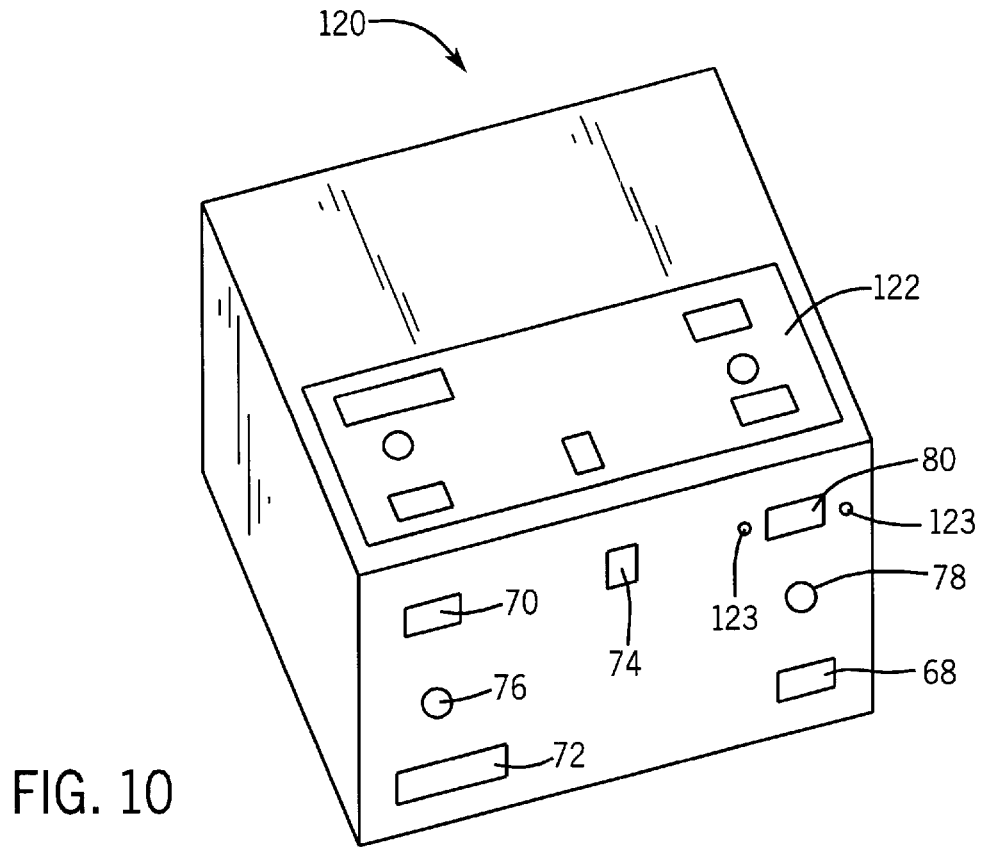
FIG. 10 illustrates a computer having electrical connectors arranged to facilitate use of a connector map, according to an exemplary embodiment of the present invention.

Referring generally to FIG. 10, an alternate embodiment of a computer 120 utilizing a connector map 122 is illustrated. In this embodiment, the electrical connections on the back of the computer 120 are configured to facilitate the installation and removal of electrical cables from the electrical connectors on the back of the computer 120 using the connector map 122. In the illustrated embodiment, the various electrical connectors 68, 70, 72, 74, 76, 78 and 80 are arranged for easy location using the connector map 122. For example, similar sized and shaped electrical connectors, such as serial port 70 and monitor port 80, may be placed at different quadrants on the back panel 32, thus reducing the likelihood of misidentification. Additionally, the connectors 68, 70, 72, 74, 76, 78 and 80 may be configured primarily along the edges of back panel 32 for easy access from the top or sides of computer 120. Other arrangements, such as tactile indicators 123, may also be used to facilitate installation and removal of a cable from an electrical connector.

Figure 11:
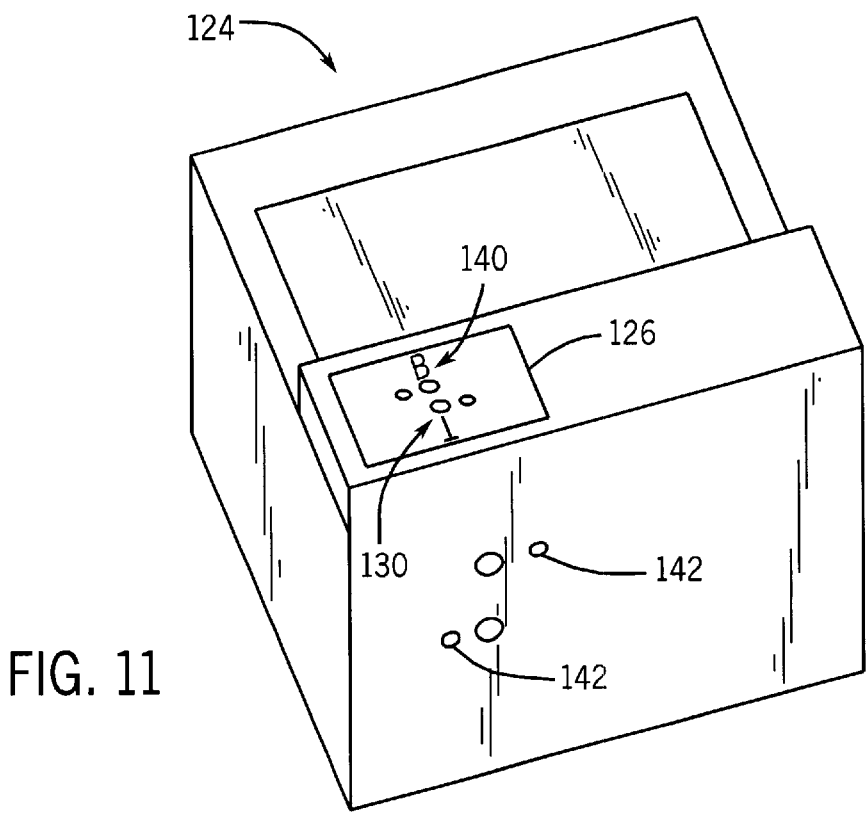
FIG. 11 illustrates a mechanical device having a connector map illustrating the location of plumbing connections on the back of the device, according to an exemplary embodiment of the present invention.

Referring generally to FIG. 11, a mechanical or electromechanical device 124 having a connector map 126 is illustrated. In the illustrated embodiment, device 124 has a first connector 128 for coupling a device 124 to a source of hot water. Additionally, the device 124 has a second connector 130 for coupling the device 124 to a source of cold water. Water hoses (not shown) may be used to couple fluid to the connectors. The first and second connectors are provided with threaded connectors. The water hoses are provided with corresponding threaded connectors configured for threaded engagement with the first and second connectors.

The first connector 128 and the second connector 130 are located on a rear portion 132 of the device 124. Connector map 126 has a first identifier 134 representing the location of first connector 128 on rear portion 132. Additionally, connector map 126 has a second identifier 136 representing the location of second connector 130 on rear portion 132. Connector map 126 also has a top identifier 138 and a bottom identifier 140 to provide a vertical reference for the connectors on the rear portion 132 of device 124. Tactile identifiers 142 may also be used to assist in the location of the connectors.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device comprising:
    a plurality of electrical connectors disposed on a rear portion of a side of the device; and
    a map comprising a thin sheet illustrating the location of each of the plurality of connectors on the rear portion of the device, the map being disposed on another side of the device.

2. The device as recited in claim 1, wherein the map provides an inverted image of the rear portion of the device.

3. The device as recited in claim 2, wherein the inverted image comprises an image of the rear portion of the device inverted about a vertical axis, the map being disposed on a top portion of the device.

4. The device as recited in claim 2, wherein the inverted image comprises an image of the rear portion of the device inverted about a horizontal axis, the map being disposed on a side portion of the device.

5. The device as recited in claim 1, further comprising a plurality of connectors and a plurality of connector representations illustrated on the connector map.

6. The device as recited in claim 5, comprising a corresponding tactile indicator for each of the plurality of connectors.

7. The device as recited in claim 1, wherein the connector comprises an electrical connector.

8. The device as recited in claim 1, wherein the connector comprises an optical connector.

9. The device as recited in claim 1, wherein the connector comprises a mechanical connector.

10. The device as recited in claim 1, comprising a tactile indicator disposed on the rear portion, the tactile indicator being represented on the map.

11. The device as recited in claim 1, comprising a plurality of connectors, wherein the plurality of connectors are configured on the rear portion of the device to facilitate identification of each of the plurality of connectors using the connector map.

12. The device as recited in claim 11, further comprising a plurality of similarly shaped connectors, each of the plurality of similarly shaped connectors being disposed at a location on the rear portion of the device remote from other similarly shaped connectors.

13. The device as recited in claim 11, wherein the device comprises a top edge, a bottom edge and two side edges, and wherein the plurality of connectors are disposed primarily along a surface proximate to the top or side edges of the rear portion of the device.

14. The device as recited in claim 1, wherein the map is configured so that the representation of the location of the connector on the rear portion of the device is substantially a mirror image of the location of the connector disposed on the rear portion of the device.

15. The device as recited in claim 1, wherein the map is disposed on a more visible side of the device.

16. A method of labeling an electrical device, comprising the acts of:

identifying a configuration of electrical connectors on a first side of an electrical device; placing tactile references on the first side of the electrical device; and illustrating an inverted view of the electrical connectors and tactile references on a connector map located on another side of the electrical device to enable a connector to be located using the connector map and at least one of the tactile references.

17. The method as recited in claim 16, wherein the act of illustrating comprises the act of configuring the view of the connectors as substantially a mirror image of the connectors on the electrical device.

18. The method as recited in claim 16, further comprising the act of:

placing the inverted view on a normally visible portion of the electrical device.

19. The method as recited in claim 16, wherein the view is a view of a rear portion of the electrical device inverted about a vertical axis, the view being disposed on a top portion of the electrical device.

20. The method as recited in claim 16, wherein the inverted view is a view of the rear portion of the electrical device inverted about a horizontal axis, the inverted view being disposed on a side portion of the electrical device.

21. An electrical device comprising:

a first side, the electrical device being adapted for selectively positioning the first side proximate to a visual obstruction;

a plurality of first electrical connectors disposed in respective positions on the first side of the electrical device to enable a plurality of second electrical connectors to be selectively connected to the plurality of first electrical connectors on the first side of the electrical device; and a visual representation of the positions of the plurality of first electrical connectors on the first side of the electrical device, the visual representation comprising a thin sheet disposed on a second side of the electrical device to enable the positions of the plurality of first electrical connectors on the first side of the electrical device to be identified with the first side positioned proximate to the visual obstruction.

22. The device as recited in claim 21, wherein the visual representation represents substantially a mirror image of an actual orientation of the plurality of first electrical connectors on the first portion of the electrical device.

23. The device as recited in claim 22, wherein the visual representation is disposed proximate to an edge that separates the first side of the device from the second side of the device, such that the edge appears to be a mirror reflecting an image of the first electrical connectors.

24. The electrical device as recited in claim 21, wherein the visual representation comprises an inverted image of the first side of the electrical device.

25. The electrical device as recited in claim 21, further comprising a plurality of tactile indicators disposed in respective positions on the first side of the electrical device, each tactile indicator being represented on the visual representation.

26. The electrical device as recited in claim 21, wherein a corresponding tactile indicator is provided for each of the plurality of electrical connectors.

27. The electrical device as recited in claim 21, wherein the plurality of electrical connectors are configured to facilitate tactile identification.

28. The electrical device as recited in claim 21, wherein each of a plurality of similarly shaped electrical connectors is disposed on separate quadrants of the first side of the electrical device.

29. The electrical device as recited in claim 21, wherein the electrical device comprises a top edge, a bottom edge and two side edges, and wherein the plurality of electrical connectors are disposed primarily along a surface proximate to the top or side edges of the first side of the electrical device.

30. A method of assembling an electrical system, the method comprising the acts of:

using a map comprising a thin sheet and illustrating positions of a plurality of electrical connectors on a rear portion of a movable electrical device to identify the position of each of the plurality of connectors on the rear portion of the device with the rear portion positioned proximate to a visual obstruction, the map being disposed on a side of the electrical device other than a side on which the plurality of first connectors are located;

locating the position of one of the plurality of first connectors on the electrical device at the position identified by the map; and performing one of removing a second connector from the identified connector and connecting a second connector to the identified connector with the rear portion of the electrical device positioned proximate to the visual obstruction.

31. The method as recited in claim 30, wherein the act of locating comprises the act of using tactile information located on the rear portion of the electrical device to identify a desired connector on the rear portion of the electrical device.

32. The method as recited in claim 30, wherein the act of using tactile information comprises the act of feeling for a specific tactile identifier for a desired connector.

33. A thin map illustrating a plurality of electrical connectors located on a less visually accessible side of an electronic device, wherein the map is disposed on a side of the electronic device that is more visually accessible, the map having a representation of each of the electrical connectors, wherein each representation is located on the map to indicate the relative vertical and horizontal position of each electrical connector on the less visually accessible side of the electronic device.

34. The device as recited in claim 21, wherein the visual representation is disposed on a more visible side of the electrical device.

* * * * *